US011870936B1

(12) United States Patent
Schwarz, Jr. et al.

(10) Patent No.: US 11,870,936 B1
(45) Date of Patent: Jan. 9, 2024

(54) AUGMENTED INTELLIGENCE FOR PROFILE-MATCHED CALL CENTER ROUTING

(71) Applicant: UIPCO, LLC, San Antonio, TX (US)

(72) Inventors: Thomas Wayne Schwarz, Jr., Helotes, TX (US); Joel S. Hartshorn, Port Orchard, WA (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/357,010

(22) Filed: Jun. 24, 2021

Related U.S. Application Data

(60) Provisional application No. 63/046,160, filed on Jun. 30, 2020.

(51) Int. Cl.
H04M 3/00 (2006.01)
H04M 3/523 (2006.01)
H04M 3/51 (2006.01)

(52) U.S. Cl.
CPC ....... *H04M 3/5233* (2013.01); *H04M 3/5175* (2013.01); *H04M 3/5237* (2013.01); *H04M 2203/408* (2013.01); *H04M 2203/558* (2013.01)

(58) Field of Classification Search
CPC . H04M 3/5233; H04M 3/5175; H04M 3/5237
USPC ....... 379/265.01–265.14, 266.01–266.1, 309
See application file for complete search history.

(56) References Cited

U.S. PATENT DOCUMENTS

| | | | | |
|---|---|---|---|---|
| 8,145,474 B1* | 3/2012 | Daily | ................. | G06F 11/2257 704/275 |
| 10,542,148 B1* | 1/2020 | Merritt | .................... | G06N 20/20 |
| 11,045,271 B1* | 6/2021 | Tran | ....................... | A61B 34/32 |
| 2007/0061190 A1* | 3/2007 | Wardell | ............. | G06Q 30/0201 705/7.29 |
| 2009/0190750 A1* | 7/2009 | Xie | ..................... | H04M 3/5232 379/266.03 |
| 2010/0254527 A1* | 10/2010 | Addair | ................ | H04M 3/5233 379/265.12 |
| 2012/0020471 A1* | 1/2012 | Erhart | ................. | H04M 3/5232 379/265.1 |
| 2013/0317886 A1* | 11/2013 | Kiran | ................. | G06Q 30/0202 705/7.31 |
| 2014/0236663 A1* | 8/2014 | Smith | ................ | G06Q 10/0633 705/7.27 |
| 2016/0142541 A1* | 5/2016 | Sharpe | ................ | H04M 3/5232 379/92.01 |
| 2019/0205891 A1* | 7/2019 | Roebuck | ................ | H04L 67/14 |

* cited by examiner

Primary Examiner — William J Deane, Jr.
(74) Attorney, Agent, or Firm — Plumsea Law Group, LLC

(57) ABSTRACT

A system and method for routing a call from a customer to a customer service representative at a call center is described. The method being performed by an augmented intelligence system. The method includes receiving an incoming call from a customer at the call center. The method also includes determining a match between a classification of the customer and a classification of a selected customer service representative based on a profile of the customer and a profile of the selected customer service representative. The method further includes routing the incoming call from the customer to the selected customer service representative.

20 Claims, 8 Drawing Sheets

US 11,870,936 B1

AUGMENTED INTELLIGENCE FOR PROFILE-MATCHED CALL CENTER ROUTING

This application claims the benefit of U.S. Provisional Patent Application Ser. No. 63/046,160 filed on Jun. 30, 2020 and titled "Augmented Intelligence for Profile-Matched Call Center Routing", the disclosure of which is incorporated by reference in its entirety.

TECHNICAL FIELD

The present disclosure generally relates to using augmented intelligence to improve a customer's experience with a service provider, and in particular, to using augmented intelligence to route calls from a customer to a particular service representative based on profile matching.

BACKGROUND

When customers have an issue or problem with a service provider or other business, they are often directed to a call center where their issue can be addressed by service representatives. These customers may occasionally be met with a poor experience when dealing with the service representative at the call center. Repeated poor experiences by the customer may result in negative consumer sentiment, bias, or eventual loss of business for the service provider.

Additionally, service representatives at the call center may experience verbal abuse or hostility from the customers they help service. Repeated abusive or hostile interactions experienced by a service representative can lead to a lasting emotional impact or constant stress. Even with counselling or assistance programs, these experiences may lead to eventual resignation from employment by the service representative.

There is a need in the art for a system and method that addresses the shortcomings discussed above.

SUMMARY

In one aspect, a method of routing a call from a customer to a customer service representative at a call center is provided. The method being performed by an augmented intelligence system. The method includes receiving an incoming call from a customer at the call center. The method also includes determining a match between a classification of the customer and a classification of a selected customer service representative based on a profile of the customer and a profile of the selected customer service representative. The method further includes routing the incoming call from the customer to the selected customer service representative.

In another aspect, a system for routing a call from a customer to a customer service representative at a call center is provided. The system includes a computer system at a call center. The computer system including at least one processor associated with a computing device and at least one database. The call center is in communication with one or more customers through a network. The at least one processor is configured to receive an incoming call from a customer at the call center and determine a match between a classification of the customer and a classification of a selected customer service representative based on a profile of the customer and a profile of the selected customer service representative. The at least one processor being further configured to route the incoming call from the customer to the selected customer service representative.

In another aspect, a method of matching a customer and a representative of a service provider at a call center is provided. The method being performed by an augmented intelligence system. The method includes building a plurality of customer profiles, including a psychographic profile for each customer of a plurality of customers of the service provider associated with the call center. The method also includes building a plurality of representative profiles, including a psychographic profile for each representative of a plurality of representatives associated with the call center. Based on the psychographic profiles for each customer and each representative, the method further includes determining compatible matches between customers and representatives. Upon receiving an incoming call from a customer, the method includes routing the incoming call to a selected representative that is determined to be a compatible match with the customer based on the respective psychographic profiles of the customer and the selected representative.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments described herein provide a system and method for using augmented intelligence to route calls from a customer to a particular service representative based on profile matching. An augmented intelligence system according to the example embodiments combines call transcription data and information from customer relationship management (CRM) systems to build scoring models for tracking both customer and service representative experiences on a per-person basis across all interactions. Personal experience data can be combined with personalized psychology models to produce psychographic profiles for customers and service representatives. These psychographic profiles can be used by the augmented intelligence system to implement real-time decision logic for personalized call center routing that is optimized around customer and/or service representative relationship needs. With this arrangement, an optimized balance can be maximized in real-time through intelligent call center routing based on psychographic profile matching.

The example embodiments described herein make use of methods and systems in augmented or artificial intelligence. As used herein, "artificial intelligence" or "augmented intelligence" may include any known methods or techniques in machine learning and related fields. As examples, artificial intelligence may include systems and methods used in natural language processing (NLP) and similar fields.

Figure 1:
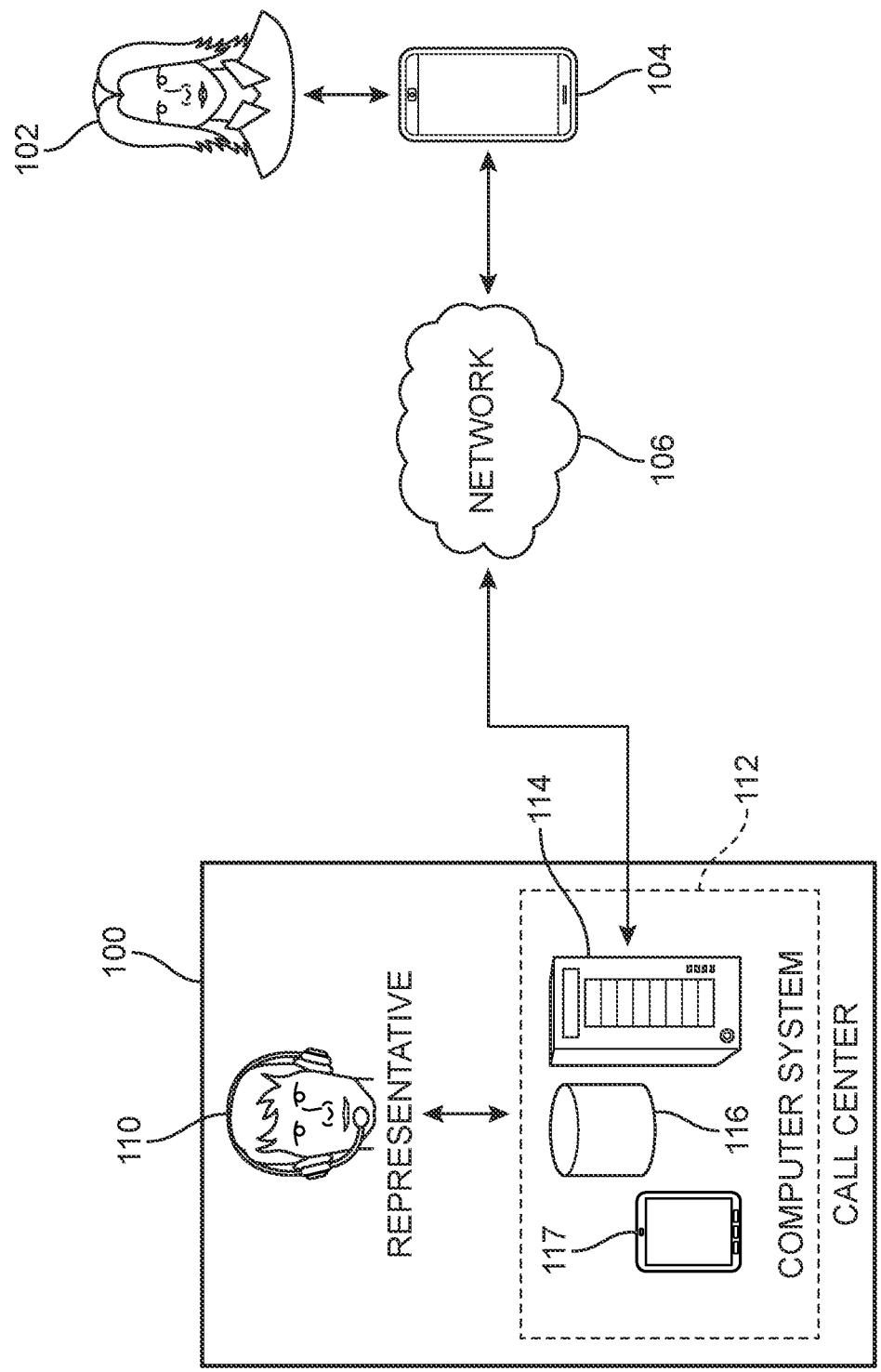
FIG. 1 is a schematic view of a system for facilitating communication between a customer and a service representative, according to an example embodiment.

Referring now to FIG. 1, an example embodiment including some of the systems, components and devices that may be used to facilitate interactions between a customer service call center 100 for a service provider and a user 102 of the customer service system. In some embodiments, call center 100 may provide customer service for any type of service provider, which may be a company or any other organization that provides services to users. For example, in one embodiment, the service provider could be a bank. In another embodiment, the service provider could be an insurance company. In another embodiment, the service provider could be a company that provides banking services and insurance services as well as other kinds of services. User 102 could be a customer, member, client, consumer, or any other user of services provided by the service provider.

To facilitate interactions with customers, members or general users of its services, customer service call center 100 for the service provider includes a plurality of service representatives, including at least one service representative 110 shown in FIG. 1. As used herein, the term "service representative" (or simply, "representative") refers to any individual operating in a capacity to represent a service provider in interactions with a customer or user. The representative could be, for example, an employee at call center 100 or a contractor or other person acting on behalf of call center 100 for the service provider. Additionally, representatives may be physically present at call center 100 and/or may be located remotely from call center 100 and have calls routed through a computer system at call center 100 to connect customers with the representative.

A representative could operate within a larger customer service system (or department) of the service provider. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

In an example embodiment, customer service call center 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, and/or perform other tasks required to help a customer calling in to call center 100.

In some embodiments, customer or user 102 may have access to a user device 104. In one embodiment, user device 104 is a mobile device, for example, a smartphone or a tablet computer. In other embodiments, however, user device 104 could include a telephone (e.g., landline and/or cellular), a tablet, a laptop, a desktop computer, or similar kind of device that allows user 102 to contact call center 100.

In some embodiments, both representative device 117 and user device 104 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 104 could operate in a client-server relationship with one or more servers of computer system 112. For example, computer system 112 may include a server that communicates with user device 104 as well as other remote devices (e.g., user devices of other customers) over a network 106. User device 104 may provide the front-end of a system that provides users with options for performing various kinds of tasks (for example, making fund transfers when the company is a bank). In some cases, user device 104 may run client software through a web browser, in which case the client software may be hosted on a server associated with computer system 112. In other cases, user device 104 may run client software in the form of a native software application that has been downloaded through a centralized marketplace (i.e., an "app store"). In some cases, while the client software that allows users to perform various tasks may be run on user device 104, the data may be retrieved from and stored on databases associated with computer system 112 (e.g., databases 116).

Figure 2:
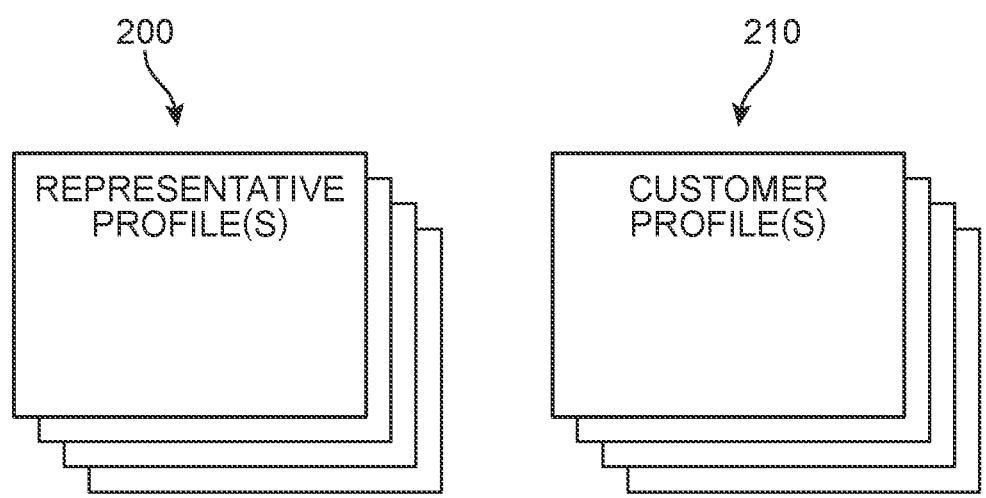
FIG. 2 is a schematic view of stored profiles for customers and service representatives, according to an example embodiment.

Referring now to FIG. 2, example embodiments of stored profiles for customers and service representatives are shown. In some embodiments, profiles for customers and service representatives may be stored at databases 116 of computer system 112 at call center 100. In this embodiment, the stored profiles include a plurality of representative profiles 200 and a plurality of customer profiles 210. Plurality of representative profiles 200 includes a unique, individual profile for each customer service representative associated with call center 100. In some cases, each representative profile of plurality of representative profiles 200 may include basic identification information associated with the representative, such as a name, employee identifier, years of experience, etc. Similarly, each customer profile of plurality of customer profiles 210 may include basic identification information associated with the customer, such as a name, address, account number(s), services or products, etc.

Additionally, according to the example embodiments described herein, each representative profile of plurality of representative profiles 200 and each customer profile of plurality of customer profiles 210 may further include psychographic information. In general, psychographics refers to the study and classification of people according to their attitudes, aspirations, and other psychological criteria. Examples of psychographic information that may be included in profiles 200, 210 includes, but is not limited to interests, likes/dislikes, values, priorities, preferences, and/or opinions. In an example embodiment, this psychographic information may be obtained from call transcription data and information from customer relationship management (CRM) systems. For example, topics that customers or representatives discuss during a call can give clues to their interests and needs, vocabulary choices can give clues to their concerns, intonation and emotive interjections can also yield clues to their sentiment. All of this different psychographic information can be combined in each customer profile and representative profile to generate a psychographic profile for the customer or representative.

In an example embodiment, each representative psychographic profile of plurality of representative profiles 200 and each customer psychographic profile of plurality of customer profiles 210 may be represented by an archetype classification, for example, using the four-way Myers-Briggs classification scheme. According to the Myers-Briggs classification scheme, personality preferences include four opposite pairs, each represented by a letter, including where a person focuses attention (e.g., Extraversion (E) or Introversion (I)), the way a person takes in information (e.g., Sensing (S) or INtuition (N)), how a person makes decisions (e.g., Thinking (T) or Feeling (F)), and how a person deals with the world around them (e.g., Judging (J) or Perceiving (P)), with a resulting 16 possible psychological types.

For example, the 16 possible psychological types that may be used as a psychographic profile for customers and/or representatives include: ESFP (Extroverted, Sensing, Feeling, Perceiving), ESFJ (Extroverted, Sensing, Feeling, Judging), ESTP (Extroverted, Sensing, Thinking, Perceiving), ESTJ (Extroverted, Sensing, Thinking, Judging), ENTJ (Extroverted, Intuitive, Thinking, Judging), ENTP (Extroverted, Intuitive, Thinking, Judging), ENFJ (Extroverted, Intuitive, Feeling, Judging), ENFP (Extroverted, Intuitive, Feeling, Perceiving), ISFP (Introverted, Sensing, Feeling, Perceiving), ISTJ (Introverted, Sensing, Thinking, Judging), ISTP (Introverted, Sensing, Thinking, Perceiving), ISFJ (Introverted, Sensing, Feeling; Judging), INFJ (Introverted, Intuitive, Feeling, Judging), INTJ (Introverted, Intuitive, Thinking, Judging), INTP (Introverted, Intuitive, Thinking, Perceiving), and INFP (Introverted, Intuitive, Feeling, Perceiving).

These psychological types have known associations and compatibilities such that a person of one psychological type may be better suited to interact and get along with a person of a subset of other psychological types. Accordingly, the techniques described herein may use these known associations and compatibilities of the different psychological types to determine profile matches between customers and representatives. That is, each representative's psychographic profile stored in plurality of representative profiles 200 and each customer's psychographic profile stored in plurality of customer profiles 210 may be used to determine a match between a compatible customer and representative when a customer calls call center 100. With this arrangement, augmented intelligence may be used to route calls from a customer to a particular service representative based on profile matching.

It should be understood that the Myers-Briggs psychological types are one example of a psychographic profile that may be established for customers and representatives. However, it should be understood that other psychological profile types or classification schemes may also be used to generate a psychographic profile for customers and representatives for use in connection with the techniques of the example embodiments described herein.

Additionally, other information associated with a customer and/or representative may be used to build or generate their profiles. For example, location-based information and/or purchase history of a customer may be factored into their profile. In some embodiments, a customer and/or representative profile may include modifications or adjustments based on dynamic factors, such as time (morning v. afternoon v. night), day (weekday v. weekend), location (home v. office v. on the road). These dynamic factors may change a psychographic profile for a customer or representative so that the modified profile is used to determine a match between the customer and representative.

Figure 3:
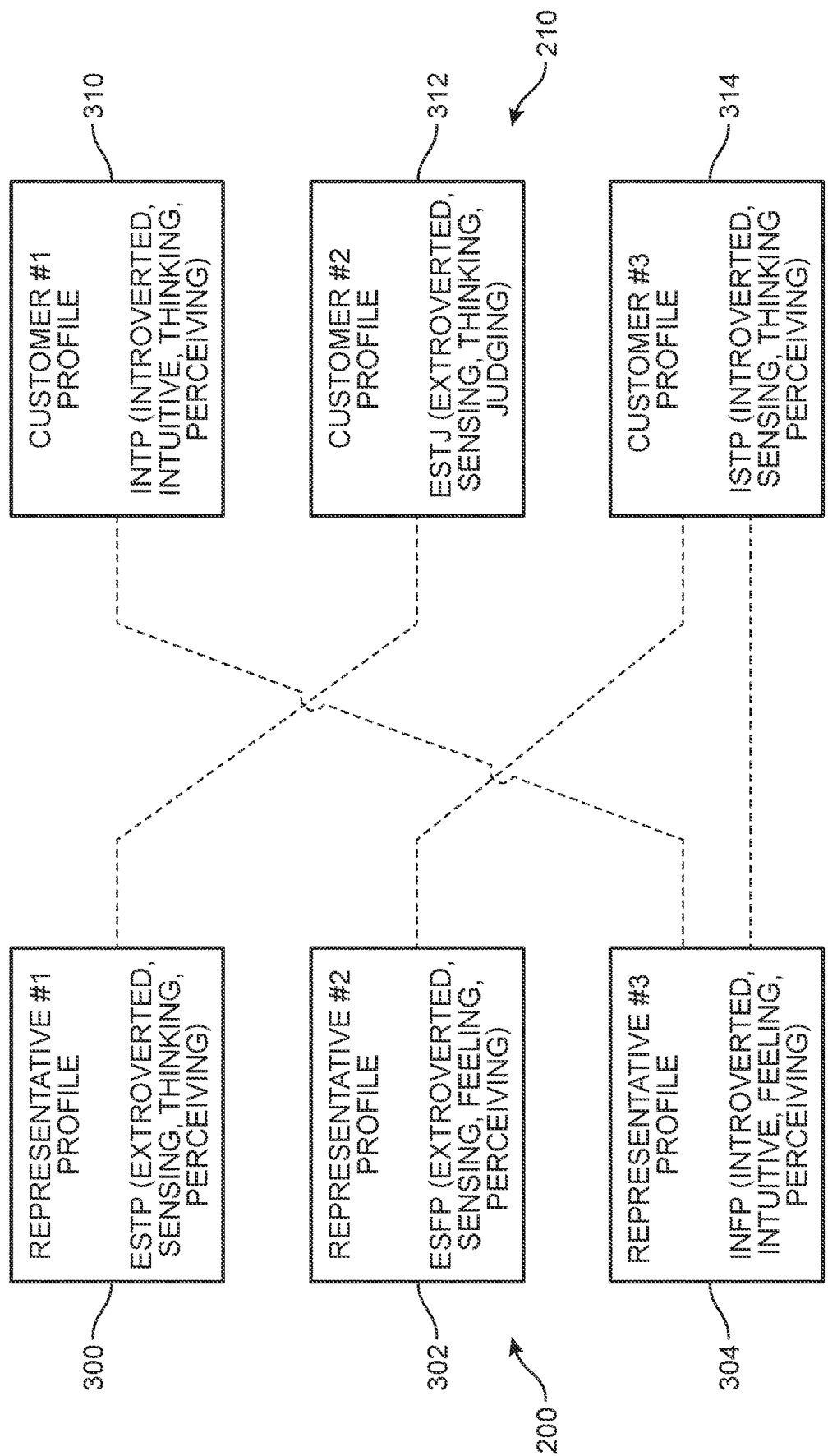
FIG. 3 is a schematic view of profile matching between customers and service representatives, according to an example embodiment.

Referring now to FIG. 3, an example embodiment of profile matching between customers and service representatives is shown. In some embodiments, a psychographic profile of a customer may be matched with at least one compatible psychographic profile of a representative based on the known compatibilities and associations between different psychological types. In this embodiment, plurality of representative profiles 200 include at least a first representative profile 300 (e.g., ESTP psychological type), a second representative profile 302 (e.g., ESFP psychological type), and a third representative profile 304 (e.g., INFP psychological type). Plurality of customer profiles 210 include at least a first customer profile 310 (e.g., INTP psychological type), a second customer profile 312 (e.g., ESTJ psychological type), and a third customer profile 314 (e.g., ISTP psychological type).

In this embodiment, plurality of representative profiles 200 includes three representative profiles (300, 302, 304) and plurality of customer profiles 210 includes three customer profiles (310, 312, 314). However it should be understood that plurality of representative profiles 200 and plurality of customer profiles 210 may include a large number of profiles for each representative and each customer of the service provider. For example, a call center, such as call center 100, may include dozens or even hundreds of representatives and a service provider may have thousands, tens of thousands, or more customers.

As shown in FIG. 3, based on the psychographic profiles of the customers and representatives, matches between the two may be made. For example, in this embodiment, first customer profile 310 (e.g., INTP psychological type) matches with third representative profile 304 (e.g., INFP psychological type), second customer profile 312 (e.g., ESTJ psychological type) matches with first representative profile 300 (e.g., ESTP psychological type), and third customer profile 314 (e.g., ISTP psychological type) matches with both or either of third representative profile 304 (e.g., INFP psychological type) and second representative profile 302 (e.g., ESFP psychological type). Similar matchings may also be made for other customers and representatives based on their profiles. With this arrangement, augmented intelligence may be used to route calls from a customer to a particular service representative based on profile matching.

Using the techniques of the example embodiments, an incoming call from a customer to a call center (e.g., call center 100) may be routed to a particular representative based on a determined profile match between the customer and the representative that indicates that the customer and representative are likely to be compatible. In addition, the same call transcription data and information from CRM systems can also be analyzed to measure or classify representative skill development criteria. This skill development criteria can also be stored in the representative's profile (e.g., in plurality of representative profiles 200) and can be used for routing calls from customers to a particular representative that meets a determined skill development criteria. For example, more skillful representatives can receive more at-risk interactions with unhappy customers, while simple interactions with happier customers can be routed to new or less skillful representatives.

Figure 4:
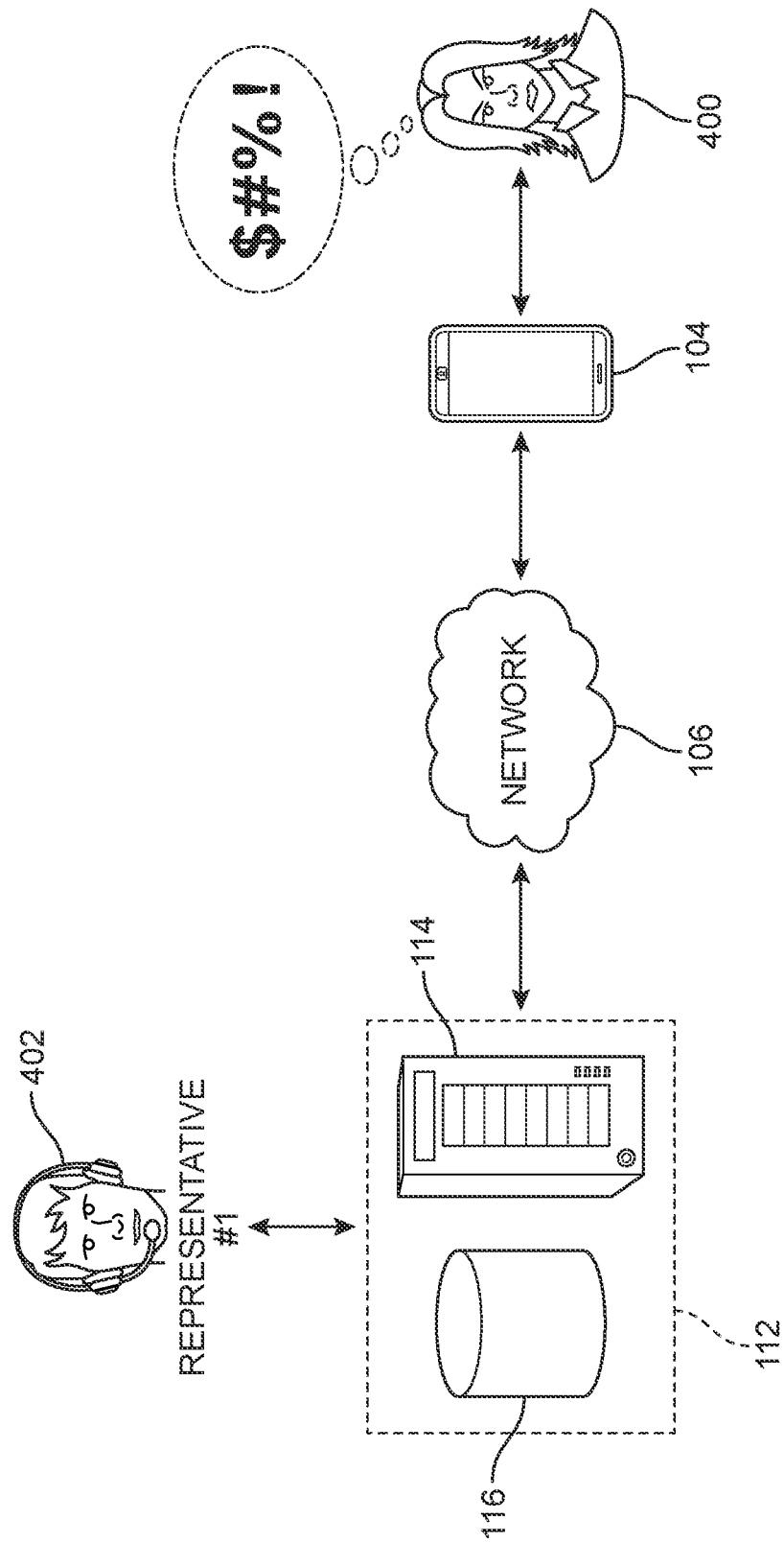
FIG. 4 is a schematic view of a process where an unhappy customer is matched to a service representative based on their profiles, according to an example embodiment.

Referring now to FIG. 4, an example of a process where an unhappy customer is matched to a service representative based on their profiles is shown. In this embodiment, an unhappy customer 400 is shown using user device 104 to contact call center 100 through network 106. In this example, computing system 112 of call center 100 may match unhappy customer 400 with a skilled representative 402 based on respective classifications of customer 400 and representative 402 from their stored profiles (e.g., saved in databases 116). For example, customer 400 may be associated with second customer profile 312 (e.g., ESTJ psychological type) as shown in FIG. 3 and representative 402 may be associated with first representative profile 300 (e.g., ESTP psychological type). Based on their respective classifications (e.g., ESTJ and ESTP), augmented intelligence of computing system 112 may match unhappy customer 400 with skilled representative 402 so as to provide an improved customer service experience for customer 400.

Moreover, if a customer has a series of poor interactions that start to affect sentiment, that customer's future calls can be routed to a more skillful representative to better manage future interactions in hopes of curtailing poor experiences, softening bad news, or preventing loss of business for the service provider.

In some embodiments, calls may also be routed by the augmented intelligence of computing system 112 at call center 100 in a way so as to provide a better experience for service representatives at call center 100. For example, if a representative handles too many difficult calls or is subject to repeated verbal abuses by customers, these trends may be detected before they become too troubling. When a representative starts to show signs of heightened stress, impatience, or emotional impact from abuse or other difficult interactions with customers, the difficulty of inbound calls can be reduced until the representative has time to cope. In other cases, the representative could be flagged for follow-up assistance, for example, a manager or counselor could be prompted to check in, or a break could be scheduled to allow decompression or relief.

Figure 5:
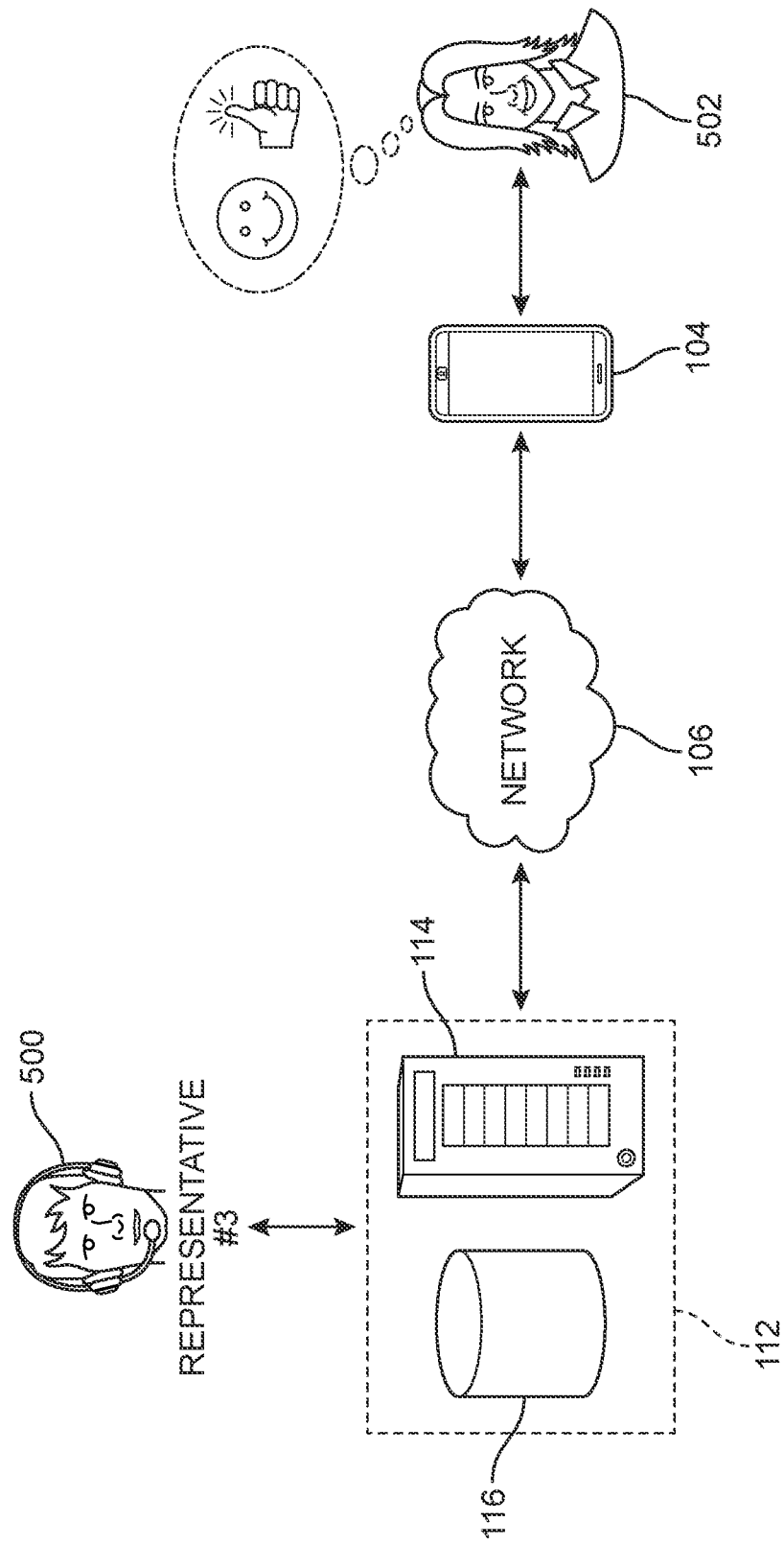
FIG. 5 is a schematic view of a process where a happy customer is matched to a service representative based on their profiles, according to an example embodiment.

Referring now to FIG. 5, an example of a process where a happy customer is matched to a service representative based on their profiles is shown. In this embodiment, a stressed representative 500 is shown receiving a call from a happy customer 502 using user device 104 to contact call center 100 through network 106. In this example, computing system 112 of call center 100 may match happy customer 502 with stressed representative 500 based on respective classifications of customer 502 and representative 500 from their stored profiles (e.g., saved in databases 116). For example, customer 502 may be associated with third customer profile 314 (e.g., ISTP psychological type) as shown in FIG. 3 and representative 500 may be associated with third representative profile 304 (e.g., INFP psychological type). Based on their respective classifications (e.g., ISTP and INFP), augmented intelligence of computing system 112 may match happy customer 502 with stressed representative 500 so as to provide an improved, less-stressful experience for representative 500.

In some embodiments, augmented intelligence systems described herein could analyze trends over time to determine if some customers are purposefully or otherwise overtly abusive in their overall interactions with representatives. Such customers could be flagged (e.g., using a flag or note in their profiles) for routing their calls directly to managers, who may offer to address the situation, realign customer expectations, or be empowered to terminate the customer-service provider relationship based on predetermined "terms of use" or "acceptable behavior" criteria. In other embodiments, skillful representatives could likewise be identified for promotion opportunities and/or for training rotations.

In some cases, a best match between a customer service representative and a customer based on their classifications from their profiles may not always be available when a customer calls into the call center. For example, the best matched representative may be on another call or may not be at the call center during the time the customer is calling. In some embodiments, one or more representatives may be grouped together into subsets or tiers of compatibility for a given customer based on the compatibilities of their classifications from their respective profiles.

Figure 6:
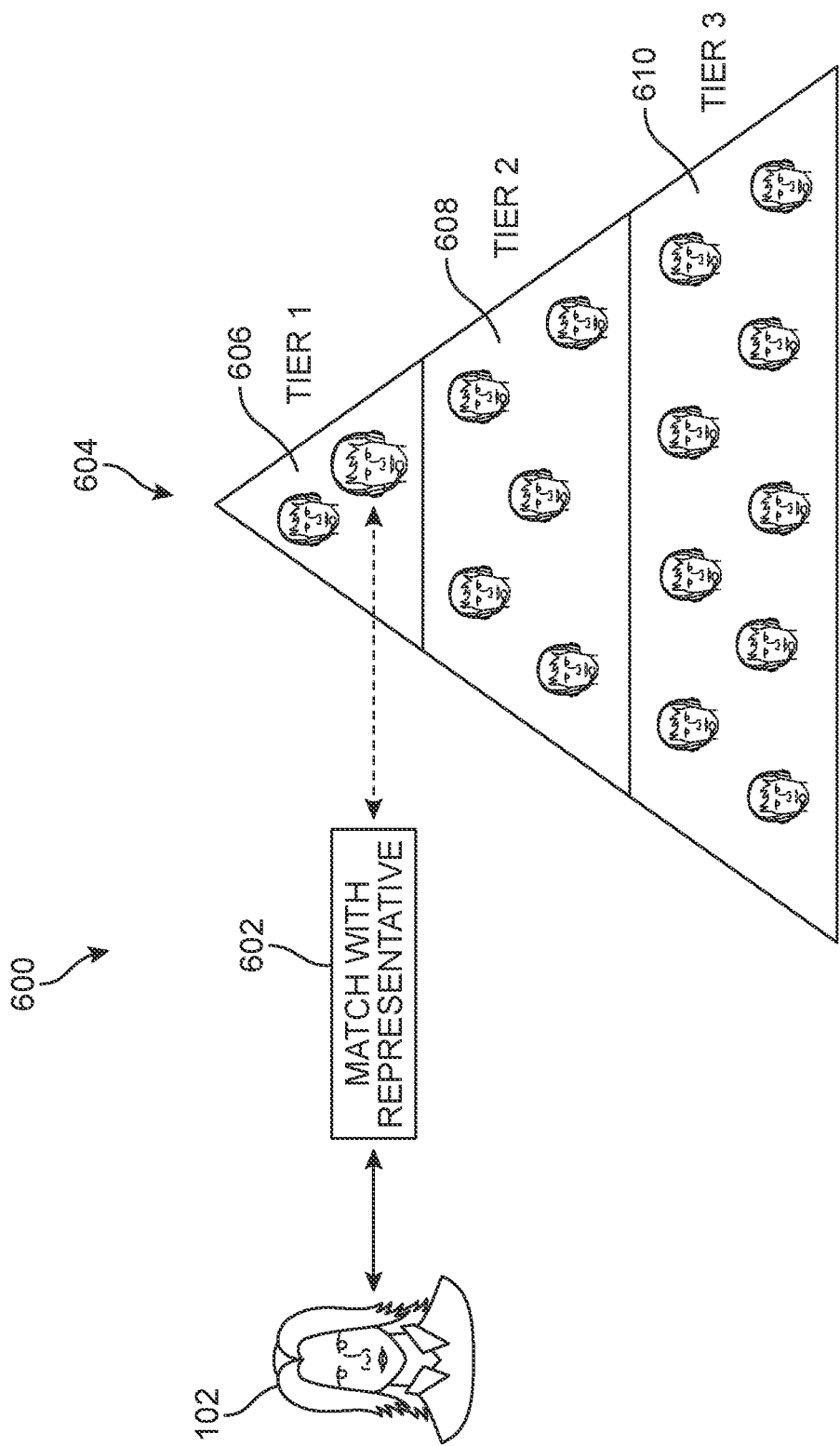
FIG. 6 is a schematic view of a tiered profile matching hierarchy according to an example embodiment.

Referring now to FIG. 6, an example embodiment of a process 600 for routing a call from a customer according to a tiered profile matching hierarchy of customer service representatives is shown. In this embodiment, process 600 includes customer 102 calling call center 100 where the augmented intelligence of computing system 112 determines a match 602 with a representative based on a tiered profile matching hierarchy 604 of customer service representatives. In this embodiment, tiered profile matching hierarchy 604 of customer service representatives are based on the respective classification compatibilities of the psychographic profiles of customer 102 and a plurality of representatives at call center 100. That is, each customer may have a different tiered profile matching hierarchy of customer service representatives based on their psychographic profile classification.

As shown in FIG. 6, tiered profile matching hierarchy 604 of customer service representatives for customer 102 includes at least three tiers or subsets of compatible representatives based on the relative compatibilities of the psychographic profile classifications. In this embodiment, a first tier 606 of representatives are determined to be the "best match" or most compatible with customer 102. Accordingly, if any of the representatives in first tier 606 are available when customer 102 calls call center 102, customer 102 is matched (i.e., at match 602) and routed to a representative in first tier 606. However, in the case that no representatives in first tier 606 are available, for example, only a small number (i.e., one or two) of representatives may be most compatible with customer 102, then customer 102 may be matched and routed to a representative in a second tier 608.

In this embodiment, second tier 608 of representatives are determined to be a "good match" or strongly compatible with customer 102. Therefore, if none of the representatives in first tier 606 are available when customer 102 calls call center 102, customer 102 is instead matched (i.e., at match 602) and routed to a representative in second tier 606. In this embodiment, second tier 608 includes a larger number of representatives (i.e., four or five) than first tier 606. Similarly, tiered profile matching hierarchy 604 may further include a third tier 610 of representatives that are determined to be an "acceptable match" or mostly compatible with customer 102. Therefore, if none of the representatives in first tier 606 or second tier 608 are available when customer 102 calls call center 102, customer 102 is instead matched (i.e., at match 602) and routed to a representative in third tier 608. In this embodiment, third tier 610 includes a larger number of representatives (i.e., 9 or ten) than first tier 606 and second tier 608.

With this arrangement, augmented intelligence of computing system 112 can match a customer with a representative based on a tiered profile matching hierarchy of customer service representatives to ensure that the customer's call will always be handled by an available representative that has at least some compatibility with the customer based on the respective profiles of the customer and representative.

Figure 7:
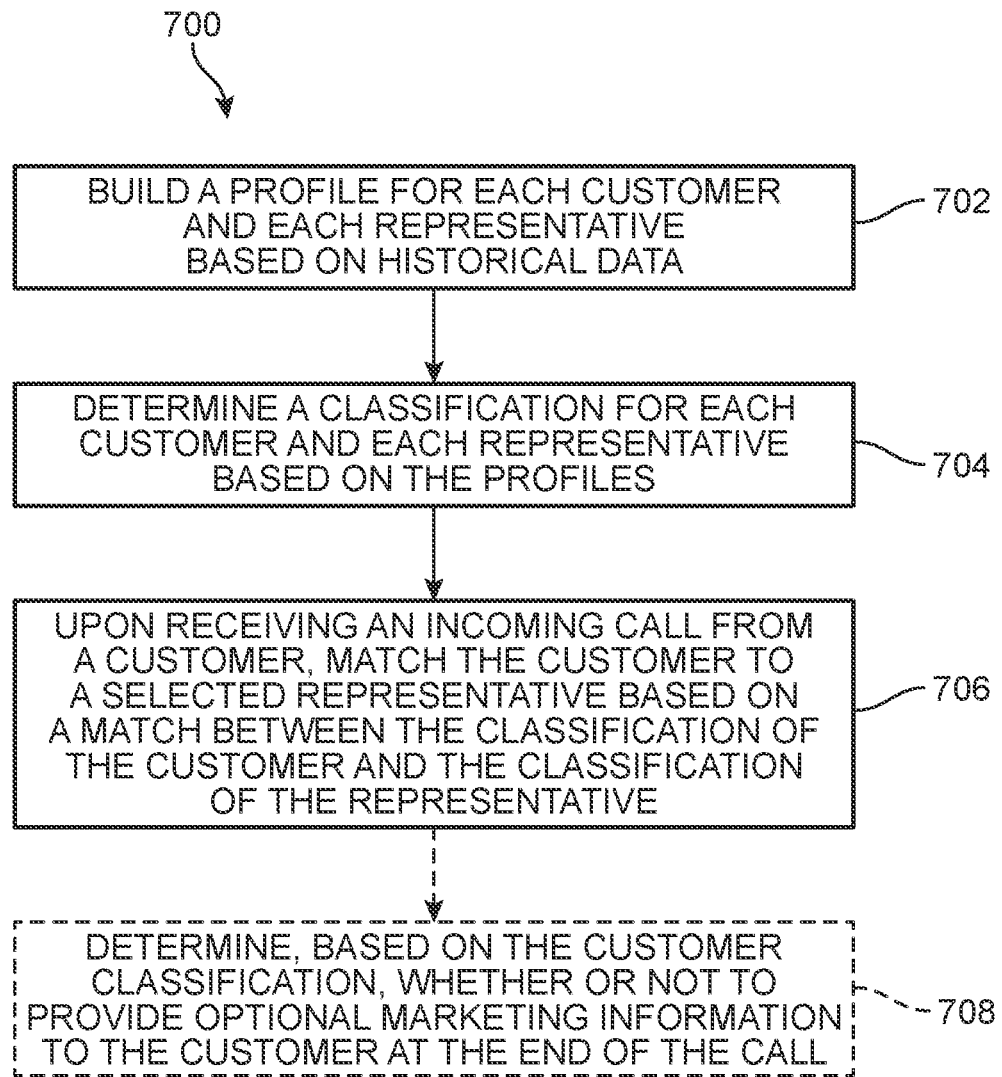
FIG. 7 is a flowchart of a method for matching a customer to a service representative based on their profiles, according to an example embodiment.

Referring now to FIG. 7, an example embodiment of a method 700 for using augmented intelligence to route calls from a customer to a particular service representative based on profile matching is shown. In some embodiments, method 700 may be implemented by at least one processor associated with a computer system of a call center, for example, a processor of computer system 112 at call center 100. In this embodiment, method 700 is implemented by computing device 114 (shown in FIG. 1).

In an example embodiment, method 700 may being at an operation 702. At operation 702, a profile is built for each customer and each representative based on historical data. For example, at operation 702, plurality of representative profiles 200 and plurality of customer profiles 210 (as shown in FIG. 2) may be built using historical data, such as call transcription data and/or information from CRM systems. Next, at an operation 704, method 700 includes determining a classification for each customer and each representative based on their profiles (e.g., profiles 200, 210). In one embodiment, at operation 704 each customer and each representative may be categorized according to a particular psychographic profile classification type, for example using the four-way Myers-Briggs classification scheme, described above.

Once each customer and each representative have been classified using their stored psychographic profile information at operation 704, method 700 may then proceed to an operation 706. At operation 706, upon receiving an incoming call from a customer, the customer is matched to a selected representative based on a match between the classification of the customer and the classification of the representative. In one embodiment, at operation 706 profile matching between the customer and a selected representative may be made according to determined compatibilities between classification types. For example, as shown in FIG. 3, certain classification types may be matched or paired based on compatibilities between the two types. With this arrangement, method 700 may be used to match a customer to a service representative based on their profiles to provide an improved customer service experience for the customer and/or representative.

In some embodiments, method 700 may end upon matching the customer and representative at operation 706. In an alternate embodiment, method 700 may further include an operation 708. Operation 708 may be optional and need not be implemented as part of method 700. In one embodiment, operation 708 includes determining, based on a customer's classification, whether or not to provide optional marketing information to the customer at the end of the call. For example, based on the particular psychographic profile classification types, some customers may be more receptive to receiving marketing information at the conclusion of their customer service call. In these cases, using the customer's classification type from their profile, a representative may either provide the optional marketing information to the customer or not. With this arrangement, marketing information or advertisements can be provided only to those customers that are determined to likely be receptive to receiving the information based on their profiles. This targeted marketing may result in increased product origination and/or sales for the service provider.

Figure 8:
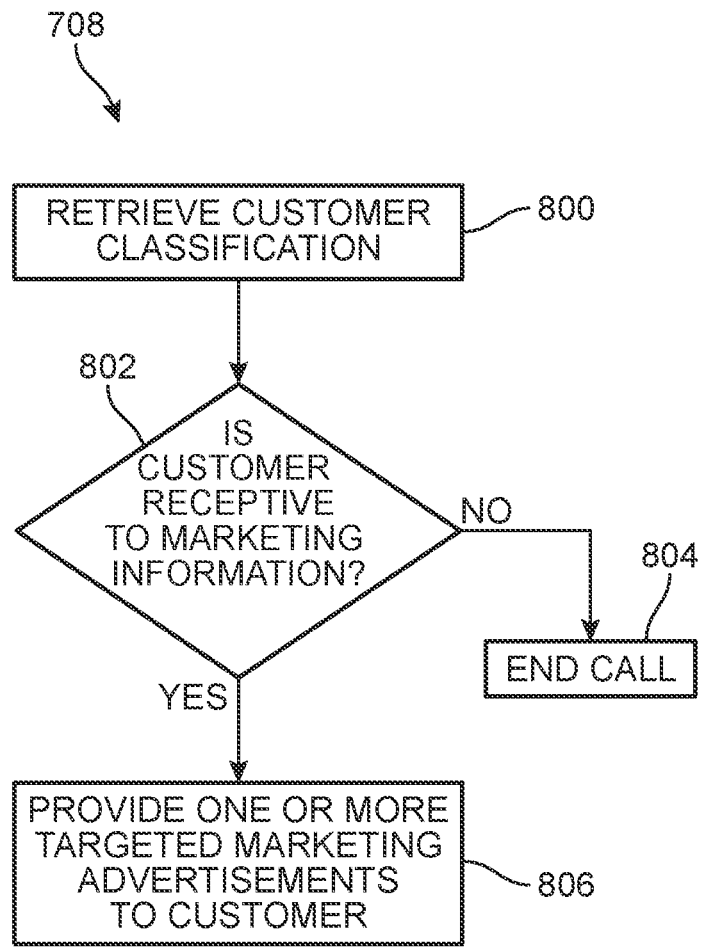
FIG. 8 is a flowchart of a method for determining whether to offer marketing advertisements to a customer based on their profile, according to another embodiment.

Referring now to FIG. 8, a flowchart of an example embodiment of a method for determining whether to offer marketing advertisements to a customer based on their profile is shown. In this embodiment, the determination of whether or not to provide the optional marketing information to the customer at operation 708 of method 700 includes an operation 800. At operation 800, the customer's classification is retrieved, for example, from the customer's stored profile in plurality of customer profiles 210. Next, at an operation 802, whether or not the customer is receptive to receiving the marketing information is determined. For example, certain classification types may be determined to be more receptive to advertisements than others. Likewise, other classification types may be determined to be more antagonistic to advertisements than other types. Additionally, at operation 802 other information may be taken into account, such as specific customer historical information that indicates that the customer has previously been receptive or interested in marketing information (e.g., the customer has opened new accounts or products in the past during calls with customer service representatives).

Upon determining at operation 802 that the customer is receptive (e.g., the decision at operation 802 is "Y" for yes), then, at an operation 806, one or more targeted marketing advertisements are provided to the customer. In addition, at operation 806, the customer's historical information saved in their profile, such as past purchases or current accounts or products, may be used to specifically target the customer. For example, if a customer's profile shows that the customer has a basic credit card, the targeted marketing advertisement at operation 806 may be to offer the customer a rewards credit card or credit card with a higher credit limit or other benefits.

Upon determining at operation 802 that the customer is not receptive (e.g., the decision at operation 802 id "N" for no), then, at an operation 804, the representative may simply end the call without providing any marketing advertisements to the customer. With this arrangement, customers with classification types that are open or receptive to marketing can receive offers from representatives, while other customers with classification types that are not receptive or hostile to marketing can be left alone without being asked about marketing advertisements.

The techniques of the present embodiments may provide for increased customer satisfaction and retention, as well as providing for increased representative satisfaction and decreased turnover for call center employees. In addition, using customer psychographic profile classification types for targeted marketing may also result in increased product origination and/or sales for the service provider.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Although the techniques of the present embodiments have been described in terms of profile matching between a customer and a call center service representative, it may be appreciated that the techniques may also be applied to other situations where profile matching may be used to determine optimal pairing. For example, the profile matching techniques may be used to determine compatible pairing between a doctor and patient, a student and teacher, an employee and mentor/supervisor, an interviewee and an interviewer, as well as other pairings where psychographic profile classification type matching can be used to help improve compatibilities between different people.

For each of the exemplary methods and/or processes described above including multiple operations, it may be understood that other embodiments some operations may be omitted and/or reordered. In some other embodiments, additional operations could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of routing a call from a customer to a customer service representative at a call center, the method performed by an augmented intelligence system, the method comprising:

receiving an incoming call from a customer at the call center;

determining a match between a classification of the customer and a classification of a selected customer service representative based on a profile of the customer and a profile of the selected customer service representative, wherein the profile of the customer includes a psychographic profile and the profile of the selected customer service representative includes a psychographic profile;

wherein determining the match between the classification of the customer and the classification of the selected customer service representative further comprises using a tiered profile matching hierarchy that is based on relative compatibilities of the psychographic profile of the customer and the psychographic profile of the selected customer service representative;

the tiered profile matching hierarchy including:

a first tier of customer service representatives that are determined to be most compatible with the customer based on the respective psychographic profiles of the customer and each customer service representative, the first tier including at least two customer service representatives, and a second tier of customer service representatives that are determined to be less compatible with the customer than the first tier based on the respective psychographic profiles of the customer and each customer service representative, the second tier of customer service representatives including a larger number of representatives than the first tier;

wherein the profile of the customer is modified using at least one dynamic factor that changes the psychographic profile for the customer, the at least one dynamic factor including one or more of a time, day, or location of the customer;

wherein the modified profile of the customer using the at least one dynamic factor that changes the psychographic profile for the customer is used to determine the compatibility match between the respective psychographic profiles of the customer and each customer service representative;

wherein, upon determining that a customer service representative in the first tier is not available, the customer is matched to a selected customer service representative in the second tier; and routing the incoming call from the customer to the selected customer service representative.

2. The method according to claim 1, further comprising:
building a plurality of customer profiles, including a profile for each customer of a plurality of customers of a service provider associated with the call center; and
building a plurality of representative profiles, including a profile for each customer service representative of a plurality of customer service representatives associated with the call center.

3. The method according to claim 2, wherein the plurality of customer profiles and the plurality of representative profiles are built using call transcription data and/or information from customer relationship management systems.

4. The method according to claim 1, wherein the classification of the customer and the classification of the selected customer service representative include an archetype classification using the four-way Myers-Briggs classification scheme.

5. The method according to claim 4, wherein determining the match between the classification of the customer and the classification of the selected customer service representative is based on compatibilities of different Myers-Briggs classification types.

6. The method according to claim 1, wherein the tiered profile matching hierarchy further includes a third tier of customer service representatives that are determined to be less compatible than the first tier and the second tier, the third tier of customer service representatives including a larger number of representatives than both the first tier and the second tier.

7. The method according to claim 1, wherein the tiered profile matching hierarchy is specific to a customer.

8. The method according to claim 6, wherein, upon determining that a customer service representative in the first tier or the second tier is not available, the customer is matched to a selected customer service representative in the third tier.

9. The method according to claim 1, wherein the profile of the selected customer service representative is also modified using at least one dynamic factor that changes a psychographic profile for the selected customer service representative, the at least one dynamic factor including one or more of a time, day, or location of the selected customer service representative.

10. The method according to claim 1, further comprising:
determining, based on the classification of the customer, whether to provide optional marketing information to the customer at the end of the call.

11. A system for routing a call from a customer to a customer service representative at a call center, comprising:
a computer system at a call center, the computer system including at least one processor associated with a computing device and at least one database;
the call center in communication with one or more customers through a network;
wherein the at least one processor is configured to:
receive an incoming call from a customer at the call center;
determine a match between a classification of the customer and a classification of a selected customer service representative based on a profile of the customer and a profile of the selected customer service representative, wherein the profile of the customer includes a psychographic profile and the profile of the selected customer service representative includes a psychographic profile;
wherein determining the match between the classification of the customer and the classification of the selected customer service representative further comprises using a tiered profile matching hierarchy that is based on relative compatibilities of the psychographic profile of the customer and the psychographic profile of the selected customer service representative;
the tiered profile matching hierarchy including:
a first tier of customer service representatives that are determined to be most compatible with the customer based on the respective psychographic profiles of the customer and each customer service representative, the first tier including at least two customer service representatives, and
a second tier of customer service representatives that are determined to be less compatible with the customer than the first tier based on the respective psychographic profiles of the customer and each customer service representative, the second tier of customer service representatives including a larger number of representatives than the first tier;
wherein the profile of the customer is modified using at least one dynamic factor that changes the psychographic profile for the customer, the at least one dynamic factor including one or more of a time, day, or location of the customer;
wherein the modified profile of the customer using the at least one dynamic factor that changes the psychographic profile for the customer is used to determine the compatibility match between the respective psychographic profiles of the customer and each customer service representative;
wherein, upon determining that a customer service representative in the first tier is not available, the customer is matched to a selected customer service representative in the second tier; and
route the incoming call from the customer to the selected customer service representative.

12. The system according to claim 11, wherein the at least one processor is further configured to:
store a plurality of customer profiles in the at least one database, the plurality of customer profiles including a profile for each customer of a plurality of customers of a service provider associated with the call center; and
store a plurality of representative profiles in the at least one database, the plurality of representative profiles including a profile for each customer service representative of a plurality of customer service representatives associated with the call center.

13. The system according to claim 11, wherein the plurality of customer profiles and the plurality of representative profiles are built using call transcription data and/or information from customer relationship management systems.

14. The system according to claim 11, wherein the classification of the customer and the classification of the selected customer service representative include an archetype classification using the four-way Myers-Briggs classification scheme.

15. The system according to claim 14, wherein the at least one processor is configured to determine the match between the classification of the customer and the classification of the selected customer service representative based on compatibilities of different Myers-Briggs classification types.

16. The system according to claim 11, wherein the tiered profile matching hierarchy further includes a third tier of customer service representatives that are determined to be less compatible than the first tier and the second tier, the third tier of customer service representatives including a larger number of representatives than both the first tier and the second tier; and wherein, upon determining that a customer service representative in the first tier or the second tier is not available, the customer is matched to a selected customer service representative in the third tier.

17. The system according to claim 11, wherein the at least one processor is further configured to determine, based on the classification of the customer, whether to provide optional marketing information to the customer at the end of the call.

18. A method of matching a customer and a representative of a service provider at a call center, the method performed by an augmented intelligence system, the method comprising:

building a plurality of customer profiles, including a psychographic profile for each customer of a plurality of customers of the service provider associated with the call center;

building a plurality of representative profiles, including a psychographic profile for each representative of a plurality of representatives associated with the call center;

based on the psychographic profiles for each customer and each representative, determining compatible matches between customers and representatives;

generating a tiered profile matching hierarchy for the customer that is based on relative compatibilities of the psychographic profile of the customer and the psychographic profile of the representatives, wherein the tiered profile matching hierarchy includes a first tier of customer service representatives that are determined to be most compatible with the customer based on the respective psychographic profiles of the customer and each customer service representative and a second tier of customer service representatives that are determined to be less compatible with the customer than the first tier based on the respective psychographic profiles of the customer and each customer service representative, the second tier of customer service representatives including a larger number of representatives than the first tier; and upon receiving an incoming call from a customer, routing the incoming call to a selected representative that is determined to be a compatible match with the customer based on the respective psychographic profiles of the customer and the selected representative according to the tiered profile matching hierarchy;

wherein the profile of the customer is modified using at least one dynamic factor that changes the psychographic profile for the customer, the at least one dynamic factor including one or more of a time, day, or location of the customer;

wherein the modified profile of the customer using the at least one dynamic factor that changes the psychographic profile for the customer is used to determine the compatibility match between the respective psychographic profiles of the customer and each customer service representative;

wherein, upon determining that a customer service representative in the first tier is not available, the customer is matched to the selected customer service representative in the second tier.

19. The method according to claim 18, wherein the psychographic profile is built using call transcription data and/or information from customer relationship management systems.

20. The method according to claim 18, wherein the tiered profile matching hierarchy further includes a third tier of customer service representatives that are determined to be less compatible than the first tier and the second tier, the third tier of customer service representatives including a larger number of representatives than both the first tier and the second tier; and wherein, upon determining that a customer service representative in the first tier or the second tier is not available, the customer is matched to the selected customer service representative in the third tier.

* * * * *